United States Patent [19]

Morlion et al.

[11] Patent Number: 5,381,496
[45] Date of Patent: Jan. 10, 1995

[54] OPTICAL OR ELECTRICAL CONNECTOR ASSEMBLY INCLUDING GUIDING ALIGNMENT PLATES

[75] Inventors: Danny L. Morlion, St. Amandsberg; Luc O. Jonckheere, Dilbeek, both of Belgium

[73] Assignee: Framatome Connectors International, Paris, France

[21] Appl. No.: 163,991

[22] Filed: Dec. 7, 1993

[30] Foreign Application Priority Data

Dec. 16, 1992 [NL] Netherlands .................. 9202172

[51] Int. Cl.⁶ .................... G02B 6/38; H01R 13/62
[52] U.S. Cl. ......................... 385/75; 385/52; 385/56; 385/71; 385/14; 385/25; 439/75; 439/377; 439/374; 439/577
[58] Field of Search .................. 385/52, 49, 55, 56, 385/14, 25, 71, 73, 75, 59, 77, 88, 89, 90, 129, 130; 439/374, 376, 377, 10, 11, 59, 64, 75, 65, 171, 172, 173, 259, 261, 287, 288, 316, 325, 329, 338, 346, 347, 377, 374, 577, 863, 864, 775

[56] References Cited

U.S. PATENT DOCUMENTS

| | | | |
|---|---|---|---|
| 4,164,363 | 8/1979 | Hsu | 385/90 X |
| 4,350,401 | 9/1982 | Allen et al. | 439/75 X |
| 4,405,200 | 9/1983 | Hoffmann et al. | 385/75 X |
| 4,555,156 | 11/1985 | Kourimsky | 439/75 X |
| 4,650,391 | 3/1987 | Adlon et al. | 414/222 |
| 4,715,824 | 12/1987 | Verhoeven | 439/391 |
| 4,898,449 | 2/1990 | Vroomen et al. | |
| 5,059,138 | 10/1991 | Olsson | 439/460 |
| 5,062,681 | 11/1991 | Furmanak et al. | 385/50 |
| 5,138,679 | 8/1992 | Edwards et al. | 385/90 |
| 5,337,392 | 8/1994 | Mousseaux et al. | 385/90 |

Primary Examiner—Brian Healy
Attorney, Agent, or Firm—Perman & Green

[57] ABSTRACT

A connector assembly for interconnecting optical and/or electrical conductors comprises a first connector part with a first guiding plate with one or more guiding channels for first conductors and a second connector part to be coupled with the first connector part and having a second guiding plate with one or more guiding channels provided in a corresponding manner for second conductors to be connected with the first conductors. The guiding plates comprise positioning means for mutually positioning the guiding plates in the coupled position of the connector parts, said positioning means comprising a first lug and a first slot with cooperating straight reference surfaces extending in x-direction and a second lug and second slot with cooperating straight reference surfaces extending in y-direction. All said reference surfaces are located at a predetermined location with respect to the guiding channels. The second guiding plate is mounted in a housing moveable in x-, y- and z-directions and wherein means are provided for exerting forces for pressing the cooperating reference surfaces and the guiding plates towards each other in the x-, y- and z-directions during coupling the connector parts. Said means include a surface formed at the second guiding plate, said surface enclosing an angle with the x-, y- and z-directions, wherein a spring means is provided exerting a force on the surface in one of these directions.

5 Claims, 1 Drawing Sheet

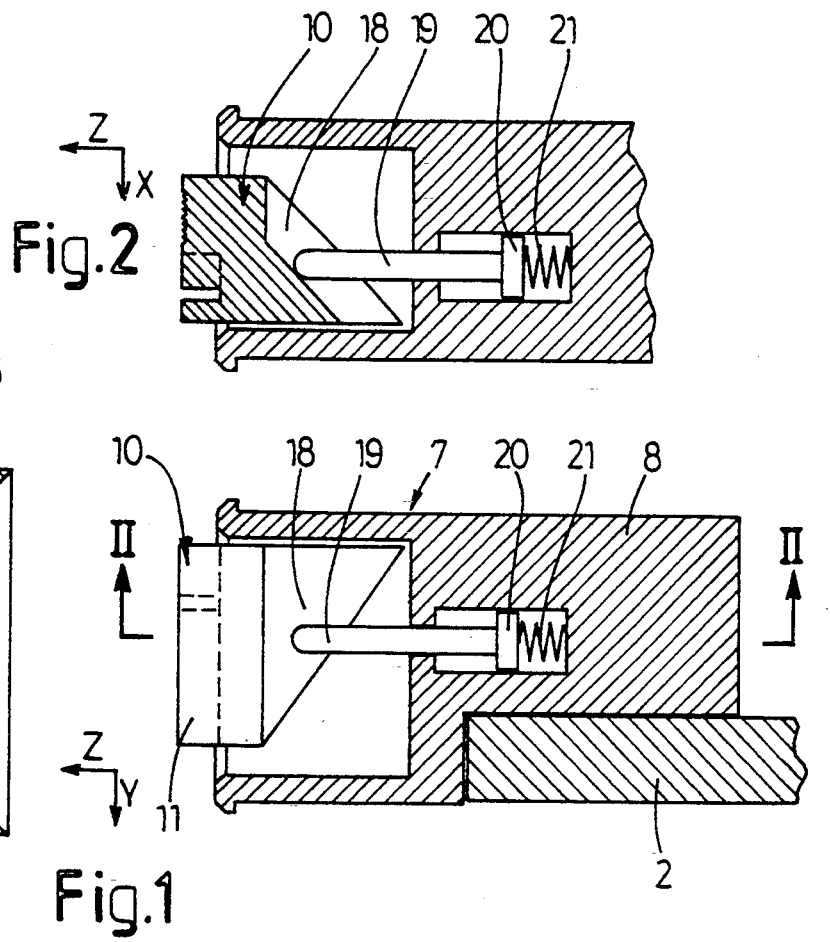
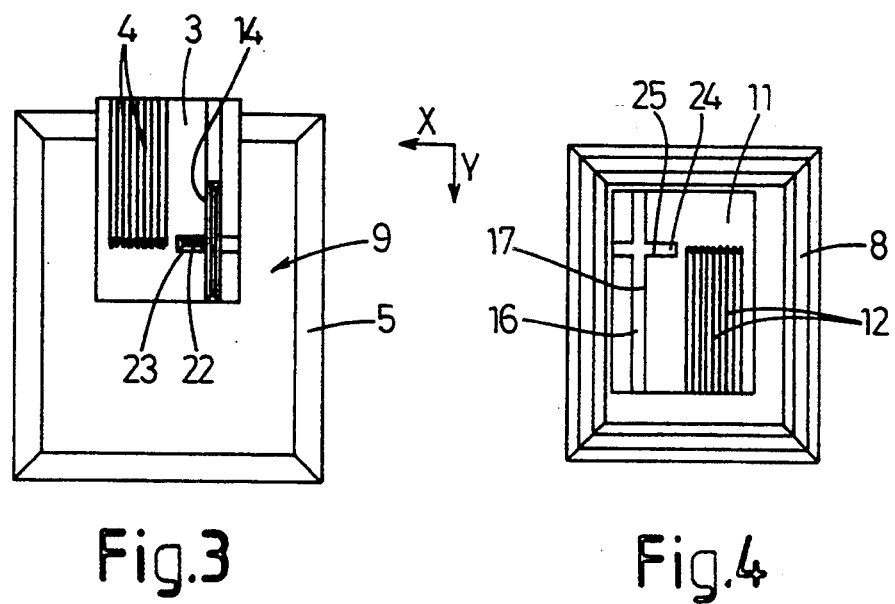

OPTICAL OR ELECTRICAL CONNECTOR ASSEMBLY INCLUDING GUIDING ALIGNMENT PLATES

BACKGROUND OF THE INVENTION

The invention relates to a connector assembly for interconnecting optical and/or electrical conductors, comprising a first connector part with a first guiding plate with one or more guiding channels for first conductors and a second connector part to be coupled with the first connector part and having a second guiding plate with one or more guiding channels provided in a corresponding manner for second conductors to be connected with the first conductors, wherein the guiding plates comprise positioning means for mutually positioning the guiding plates in the coupled position of the connector parts, said positioning means comprising a first lug and a first slot with cooperating straight reference surfaces extending in x-direction and a second lug and second slot with cooperating straight reference surfaces extending in y-direction, all said reference surfaces being located at a predetermined location with respect to the guiding channels, wherein the second guiding plate is mounted in a housing moveable in x-, y- and z-directions and wherein means are provided for exerting forces for pressing the cooperating reference surfaces and the guiding plates towards each other in the x-, y- and z-directions during coupling the connector parts, as described in the pending application Ser. No. 08/063,447, pending, assigned to the same assignee.

SUMMARY OF THE INVENTION

It is an object of the invention to simplify the construction of the above-mentioned connector assembly.

According to the invention a connector assembly is provided for interconnecting optical and/or electrical conductors, comprising a first connector part with a first guiding plate with one or more guiding channels for first conductors and a second connector part to be coupled with the first connector part and having a second guiding plate with one or more guiding channels provided in a corresponding manner for second conductors to be connected with the first conductors, wherein the guiding plates comprise positioning means for mutually positioning the guiding plates in the coupled position of the connector parts, said positioning means comprising a first lug and a first slot with cooperating straight reference surfaces extending in x-direction and a second lug and second slot with cooperating straight reference surfaces extending in y-direction, all said reference surfaces being located at a predetermined location with respect to the guiding channels, wherein the second guiding plate is mounted in a housing moveable in x-, y- and z-directions and wherein means are provided for exerting forces for pressing the cooperating reference surfaces and the guiding plates towards each other in the x-, y- and z-directions during coupling the connector parts, wherein said means include a surface formed at the second guiding plate, said surface enclosing an angle with the x-, y-and z-directions, wherein a spring means is provided exerting a force on the surface in one of these directions.

In this manner a connector assembly is obtained wherein only one spring means is required for generating the required forces in the x-, y- and z-directions in that the force exerted by this spring means on the oblique surface is distributed by this surface in the x-, y- and z-directions.

BRIEF DESCRIPTION OF THE DRAWINGS

The invention will be further explained by reference to the drawings, in which an embodiment is shown very schematically.

FIG. 1 is a cross section of an embodiment of the connector assembly of the invention wherein the connector parts are shown in the disconnected position.

FIG. 2 is a cross section according to the plane II—II of the right connector part of FIG. 1.

FIG. 3 is a schematical top view of the left connector part of FIG. 1.

FIG. 4 is an end view of the right connector part of FIG. 1.

DETAILED DESCRIPTION OF A PREFERRED EMBODIMENT

In FIG. 1 there is shown a connector assembly for interconnecting optical and/or electrical conductors, in particular the contact pads thereof, in an embodiment for providing connections between printed circuit boards, for example a first printed circuit board 1 and a second printed circuit board 2. In a manner not further shown and known per se optical fibres are embedded in the printed circuit boards 1 and 2, said optical fibres in the printed circuit board 1 being provided with contact pads in one plane with the surface of the printed circuit board 1. To this end a first guiding plate 3 is embedded in the printed circuit board 1, a main surface of which can lie in one plane with the surface of the printed circuit board 1. However, it is also possible that the main surface of the guiding plate 3 lies below the surface of the printed circuit board 1. Guiding channels 4 are provided in the guiding plate 3, wherein an optical fibre is located in each of said guiding channels 4 so that the position of the optical fibres is determined by the guiding channels 4. These guiding channels 4 incline gradually upwardly to the main surface of the guiding plate 3 so that the ends of the optical fibres are guided towards this main surface. The portions of the optical fibres projecting out of the printed circuit board 1, are polished in such a manner that they will be lying in the surface of the printed circuit board 1. The guiding plate 3 together with a housing 5 at least partially enclosing this guiding plate 3 forms a first connector part 6 of the connector assembly.

A second connector part 7 comprises a housing 8 which can be received in a receiving space 9 of the housing 5. A moveable element 10 is mounted in the housing 8, the end part of which projecting out of the housing 8 is functioning as second guiding plate 11. Guiding channels 12 corresponding with the guiding channels 4 are provided in this guiding plate 11 and these guiding channels 12 also debouch gradually into the main surface of the guiding plate. The optical fibres embedded in the printed circuit board 2 are guided out of the printed circuit board in a manner not further shown and are fixed in the guiding channels 12, so that the position of the optical fibres of the printed circuit board 2 is also determined by the guiding channels 12. The portions of the optical fibres projecting out of the guiding plate 11 are polished in such a manner that contact pads in the main surface of the guiding plate 11 are obtained.

In order to establish a good connection between the conductors of the printed circuit board 1 and the printed circuit board 2 it is very important that the contact pads of the optical fibres will contact each other accurately, in particular in a direction transverse to the longitudinal direction of the guiding channels 4 and 12, respectively. To this end the guiding plate 3 comprises a lug 13 with a straight reference surface 14, lying at a predetermined location fixed with very high accuracy with respect to the guiding channels 4. Manufacturing such a straight reference surface at an accurately determined location with respect to the guiding channels 4 is relatively simple from a manufacturing point of view. The lug 13 is provided with aligning edges 15 at its protruding end.

The guiding plate 11 is provided with a slot 16 with a straight reference surface 17 lying at the same predetermined location fixed also with high accuracy with respect to the guiding channels 12. When the connector parts 6, 7 are brought into the coupled position, the housings 5, 8 are positioned with respect to each other first, whereby a rough positioning is obtained. The element 10 is mounted in the housing 8 moveable in three mutual perpendicular directions, which directions are indicated in the drawing as x-, y- and z-directions. The reference surfaces 14, 17 are parallel to the y-direction.

In the described embodiment the element 10 comprises a surface 18 enclosing an angle with the x-, y- and z-directions. A pin 19 is slidably mounted in the housing 8, wherein a smooth rounded end of the pin 19 engages the oblique surface 18. At the other end the pin 19 has a head 20 engaged by a spring 21 pressing the pin 19 against the surface 18. By this construction the single spring 21 exerts a force on the oblique surface 18 which force is distributed in the x-, y-and z-directions. Preferably the oblique surface 18 encloses an angle of 45° with each of these directions. The oblique surface 18 itself is preferably smoothly polished so that the friction forces between the end of the pin 19 and this surface are minimal.

When both connector parts 6, 7 are connected with each other, the lug 13 brings the guiding plates 3 and 11 in the mutual correct position by cooperation with the slot 16, wherein the reference surface 17 is pressed against the reference surface 14 by the operation of the spring 21. Thereby the guiding channels 4 and 12 are accurately aligned and the contact pads of the conductors are accurately positioned with respect to each other transverse to these guiding channels.

Positioning in the longitudinal direction of the guiding channels 4, 12 is obtained in a corresponding manner by means of a lug 22 with a straight reference surface 23 extending in x-direction. This lug 22 is also provided with aligning edges 15. The guiding plate 11 has a slot 24 with a straight reference surface 25. The spring 21 generates a force through the pin 19 and the surface 18 pressing the reference surface 25 of the slot 24 against the reference surface 23 of the lug 22. Thereby the mutual position of the guiding channels 4, 12 is also accurately fixed in the longitudinal direction and the contact pads of the conductors are also accurately positioned with respect to each other in the longitudinal direction.

Finally the spring 21 through the pin 19 and the surface 18 also provides for pressing the contact pads of the conductors against each other in the coupled position of the connector parts 6, 7 by pressing the guiding plate 11 in the direction of the guiding plate 3.

The invention is not restricted to the above-described embodiment which can be varied in a number of ways within the scope of the claims.

We claim:

1. Connector assembly for interconnecting optical and/or electrical conductors, comprising a first connector part with a first guiding plate with one or more guiding channels for first conductors and a second connector part to be coupled with the first connector part and having a second guiding plate with one or more guiding channels provided in a corresponding manner for second conductors to be connected with the first conductors, wherein the guiding plates comprise positioning means for mutually positioning the guiding plates in the coupled position of the connector parts, said positioning means comprising a first lug and a first slot with cooperating straight reference surfaces extending in x-direction and a second lug and second slot with cooperating straight reference surfaces extending in y-direction, all said reference surfaces being located at a predetermined location with respect to the guiding channels, wherein the second guiding plate is mounted in a housing moveable in x-, y- and z-directions and wherein means are provided for exerting forces for pressing the cooperating reference surfaces and the guiding plates towards each other in the x-, y- and z-directions during coupling the connector parts, wherein said means include a surface formed at the second guiding plate, said surface enclosing an angle with the x-, y- and z-directions, wherein a spring means is provided exerting a force on the surface in one of these directions.

2. Connector assembly according to claim 1, wherein a pin is slidably mounted in the housing, said pin with one end engaging the oblique surface of the second guiding plate and being loaded at its other end by a spring.

3. Connector assembly according to claim 2, wherein said one end of the pin is made smoothly and rounded and that preferably the oblique surface of the guiding plate is also made smoothly.

4. Connector assembly according to claim 2, wherein the pin is mounted in the housing slidable in the z-direction.

5. Connector assembly according to claim 1, wherein the oblique surface of the second guiding element encloses an angle of 450° with the x-, y- and z-directions.

* * * * *